United States Patent
Öhmark

(10) Patent No.: US 7,762,210 B2
(45) Date of Patent: Jul. 27, 2010

(54) CONSTRUCTION FOR AN OVERHANG IN A PIT OF A MILKING PARLOUR

(75) Inventor: Olle Öhmark, Vännäs (SE)

(73) Assignee: Delaval Holding AB, Tumba (SE)

( * ) Notice: Subject to any disclaimer, the term of this patent is extended or adjusted under 35 U.S.C. 154(b) by 758 days.

(21) Appl. No.: 10/514,890

(22) PCT Filed: May 14, 2003

(86) PCT No.: PCT/SE03/00782

§ 371 (c)(1),
(2), (4) Date: Aug. 9, 2005

(87) PCT Pub. No.: WO03/096802

PCT Pub. Date: Nov. 27, 2003

(65) Prior Publication Data

US 2006/0112651 A1 Jun. 1, 2006

(30) Foreign Application Priority Data

May 17, 2002 (SE) .................................. 0201495

(51) Int. Cl.
  *A01J 3/00* (2006.01)
  *A01J 5/00* (2006.01)
(52) U.S. Cl. .................................................. 119/14.03
(58) Field of Classification Search ............... 119/14.03, 119/520; 52/169.6, 169.7, 166, 73
See application file for complete search history.

(56) References Cited

U.S. PATENT DOCUMENTS

| 3,747,289 | A | * | 7/1973 | Collins et al. | .................. 52/73 |
| 4,256,055 | A | | 3/1981 | Schlatter | |
| 4,452,175 | A | | 6/1984 | Thompson et al. | |
| 4,796,391 | A | * | 1/1989 | Lu | ................................ 52/73 |
| 5,000,119 | A | * | 3/1991 | Moreau et al. | ........... 119/14.03 |
| 5,259,335 | A | * | 11/1993 | Moreau | ................... 119/14.03 |
| 5,361,722 | A | | 11/1994 | Tecza | |
| 6,216,633 | B1 | * | 4/2001 | Gallagher et al. | ......... 119/14.03 |
| 2002/0189547 | A1 | * | 12/2002 | Eppers et al. | ............. 119/14.03 |

FOREIGN PATENT DOCUMENTS

| DE | 3941613 A1 | | 6/1990 |
| GB | 1 481 674 A | | 8/1977 |
| GB | 2203624 A | * | 10/1988 |
| WO | WO 2006133915 A1 | * | 12/2006 |

* cited by examiner

*Primary Examiner*—Michael R Mansen
*Assistant Examiner*—Monica Williams
(74) *Attorney, Agent, or Firm*—Harness, Dickey & Pierce, P.L.C.

(57) ABSTRACT

The present invention relates to a construction for an overhang (5) in a pit (1) of a milking parlour. The construction comprises a metal profile (2) fastened to the edge of the pit (1), and a reinforcement strut (6) mounted to said profile (2) in order to support an overhang (5) attached to said profile (2). The invention provides more space in the pit (1) for mounting of milking related equipment.

12 Claims, 3 Drawing Sheets

CONSTRUCTION FOR AN OVERHANG IN A PIT OF A MILKING PARLOUR

FIELD OF THE INVENTION

The present invention relates to an inventive construction for an overhang of a pit in a milking parlour. More specifically, the present invention relates to an assembly including a profile fastened to the edge of the pit, an overhang fastened to this profile, and a reinforcement strut supporting said overhang.

BACKGROUND OF THE INVENTION

When milking cows by using automatic milking systems, various equipment is needed, for example milk pipelines, wash lines and milk meters. This equipment should, of course, be located as conveniently as possible, that is, in connection with and near the cows. When using a low line installation, a problem is the limited space available to this end.

In present day solutions, an overhang, usually consisting of concrete, is built over the edge of the pit. The equipment is then fastened to the overhang and/or the pit wall. However, besides the fact that it is expensive and difficult to build this overhang, this solution does not provide as much space for the equipment as would be desired, since the concrete overhang has a rather great thickness. Furthermore, the equipment fastened to the overhang is often in the way of the person milking the cows.

Another problem with the presently used concrete overhangs, is that a cow standing on the overhang may move backwards too much, in the worst case resulting in that the cow falls down into the pit. Even if the cow does not actually fall down into the pit, there is a potential danger that the cow will damage the equipment mounted in the pit, by, for example, kicking the equipment or stepping an it. Further, the equipment may be damaged or contaminated by manure.

SUMMARY OF THE INVENTION

It is an object of the present invention to provide an overhang in a pit of a milking parlour that allows a simpler and cheaper mounting, and provides more space in the pit for milking related equipment.

This object is achieved by a construction wherein the profile is fastened to an edge of the pit and the overhang is attached to the profile.

According to the present invention, a construction is provided including a profile mounted to the edge of a pit, on which an overhang is fastened, for example by welding the overhang to said profile. The assembly further includes a reinforcement strut, also fastened to the profile, supporting the overhang. This provides an overhang with a much smaller thickness than the overhangs presently used, thereby creating more space for milking related equipment. Further, the profile, the overhang and the reinforcement strut may be pre-manufactured and assembled, thereby giving a cheaper overhang construction, mountable in the pit in an easy way and avoiding laborious installation work in the pit.

In accordance with one embodiment of the present invention, a ⌈-shaped profile beam is provided at the edge of the pit. The profile beam is preferably anchored into the concrete wall of the pit, and provides an eminent and rigid fastening surface for milking related equipment.

In accordance with another embodiment of the present invention, the overhang is slanted upwards. This feature prevents the cows from falling into the pit, and prevents them from damaging the milking related equipment placed in the pit. The fact that the overhang is being bent also stiffens it, and a thinner metal plate may be used.

In accordance with one embodiment of the present invention, the outer end of the overhang is wadded in order to provide convenient leaning means to a person working in the pit. Thereby more comfortable working conditions are provided, at a rather low cost.

In accordance with another embodiment of the present invention, holding rails, holders and supports are fastened to the profile. The at least one holding rail extends longitudinally along the profile, and means are included for adjustably fasten milking related equipment to the holding rail(s). In this way more longitudinal space for milking related equipment is provided in the pit.

In accordance with still another embodiment of the present invention, the means for fastening milking related equipment in an adjustable way, comprises one or more holders, being adjustably fastened to the holding rails. This gives a modular solution for fastening milking related equipment in the pit. The holders can in a simple way be positioned at different distances from each other at the holding rails, and the equipment need not be fastened to the concrete wall.

In accordance with another embodiment of the present invention, the holding rails, holders and supports may be pre-manufactured and pre-set, thereby again avoiding laborious installation work in the pit. Further, there is no need to fasten the equipment directly to the concrete wall of the pit, thereby minimising drilling of holes in the concrete wall.

In accordance with yet another embodiment of the present invention, one or more pipe supports are adjustable fastened to the holders. As in the embodiment above, this gives a modular solution for fastening milking related equipment in the pit, adding even more flexibility, since the pipe supports in turn can be positioned at different heights on the plurality of holders. Further, this provides means for achieving a desired slope for milk lines, wash lines or other equipment attached to the pipe supports.

DETAILED DESCRIPTION OF PREFERRED EMBODIMENTS

Figure 1:
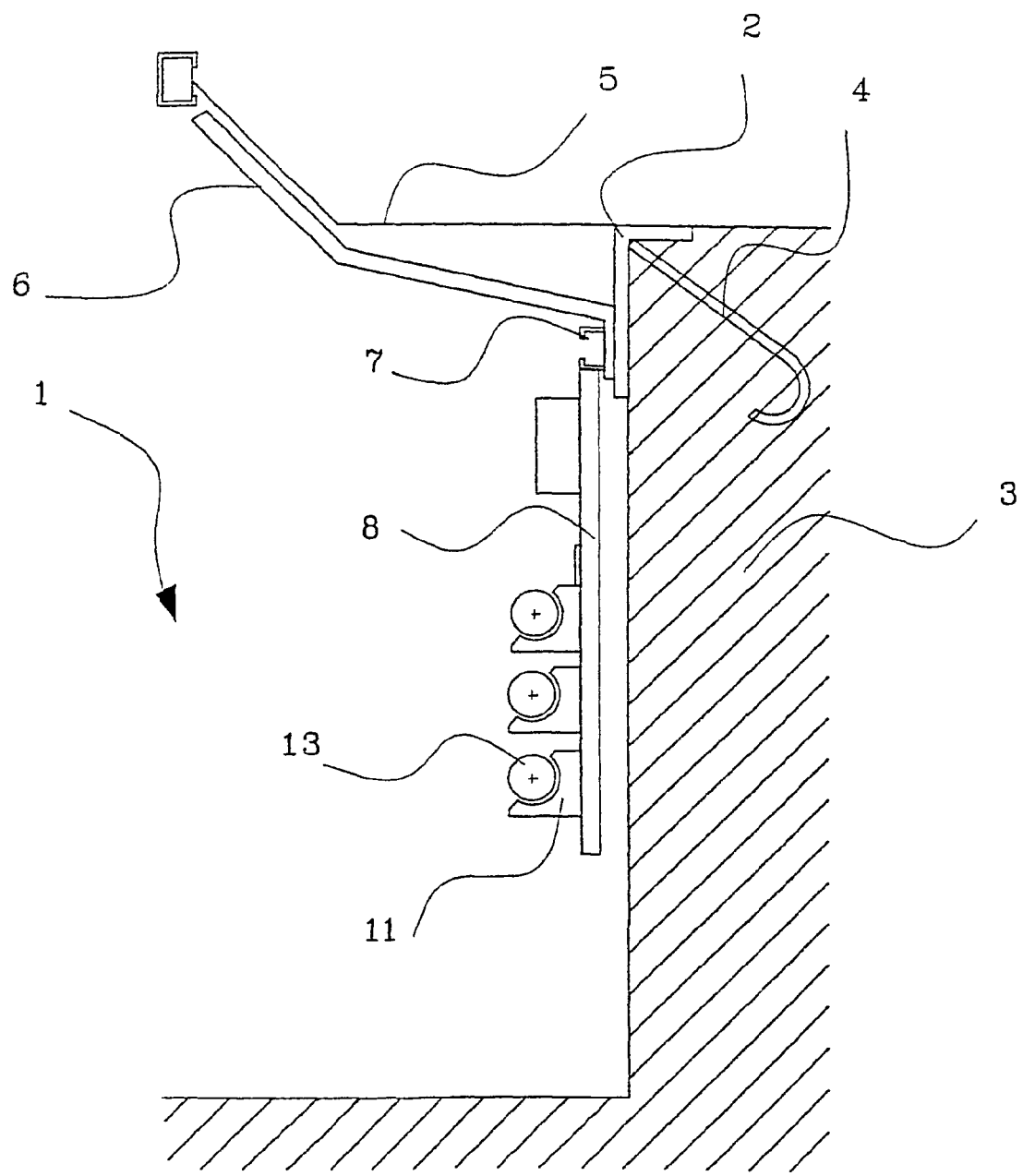
FIG. 1 shows one embodiment of the present invention, illustrating the inventive construction for an overhang.

FIG. 1 shows an embodiment of the present invention, illustrating the inventive construction of an overhang in a pit of a low-line milking parlour system.

When constructing the pit 1, which usually is poured in concrete, an ⌈-shaped metal profile 2 is positioned so as to form the edge of the pit 1. The profile 2 is fastened into the pit wall 3 by means of bolts or the like. The profile 2 is further preferably also anchored into the pit wall 3 by means of an anchor 4. This provides a very secure attachment of the profile 2 into the pit wall 3, thereby assuring a safe fastening even when the profile 2 is heavily loaded.

An overhang 5 is fastened to the profile 2 by means of, for example, welding, and it preferably consists of a metal plate, with a rather small thickness. A reinforcement strut 6, also fastened to the profile 2, acts as a support for the overhang 5, and contributes to the fact that the overhang 5 may be rather thin and non-bulky. The overhang 5 is preferably bent at a desired length, which gives a stiffened overhang, further enabling the use of a rather thin overhang. In consequence, the reinforcement strut 6 is also bent in order to be able to support the overhang 5 properly.

By using the inventive construction, more space is created in the pit 1, compared to the thick overhangs made of concrete that are predominantly used today. Furthermore, space is also provided for holding rails to be fastened to the profile 2, and thereby plenty of room for providing a desired slope of milk lines, described in more detail below. In addition, the construction for an overhang according to the present invention is simpler and less expensive to build than said prior art overhangs, that involves the quite elaborate casting of the protruding overhang. This is avoided according to the present invention.

The profile 2, the overhang 5 and the reinforcement strut 6 may in addition be pre-manufactured and supplied in desired lengths. Laborious work in the pit 1 can thereby be avoided, by easily fastening the assembled construction consisting of the profile 2, the overhang 5 and the reinforcement strut 6 in the pit.

The inventive construction is further flexible in that the length of the overhang 5 and the reinforcement strut 6 may be altered. That is, a larger overhang 5 and reinforcement strut 6 may be used in order to create a larger overhang, or the reverse, a shorter overhang 5 and reinforcement strut 6, if a smaller overhang is desired. Thereby more space may again be provided in the pit 1, by not using an unneeded length of the overhang 5.

The use of a bent and thereby slanted overhang 5, as described above, offers a further advantage compared to prior art in that it prevents cows standing on it from falling into the pit 1, should they move backwards too much. The upwards slanted overhang 5 also prevents the cows from accidentally kicking or stepping on the milking related equipment placed in the pit 1, and thereby damaging the equipment. In addition, by using such a slanted overhang, the equipment is also protected from manure, that could otherwise fall down over it.

The end of the overhang 5, or the reinforcement strut 6, may be wadded in order to provide the person working in the pit with a comfortable support to lean against, for example when milking the cows.

In FIG. 1, the profile (2) is shown to be a ⌈-shaped profile. It is to be noted that other profiles may be used as well, the profile (2) may for example be I-shaped, U-shaped, or have any other appropriately shaped profile.

The profile 2 preferably includes drilled holes, into which the one or more holding rails 7, described below, are easily fastened by means of screws, bolts or the like. Other means of fastening are course also possible, such as welding if the holding rails 7 are made of metal.

Figure 2A:
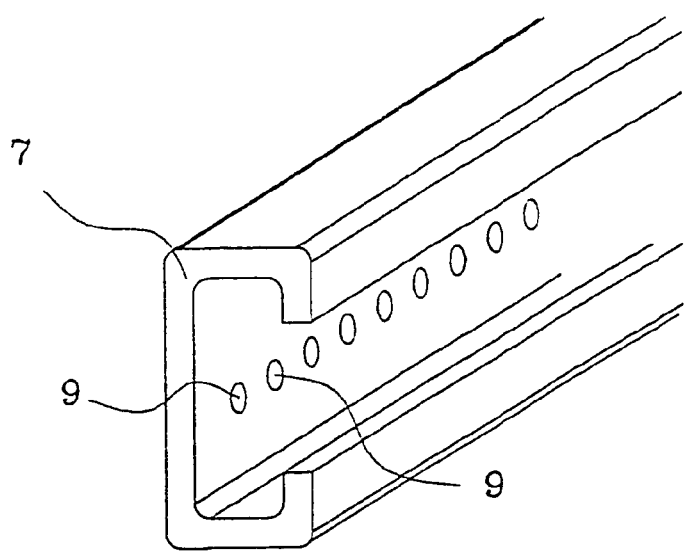
FIGS. 2a and 2b show a holding rail and a holder respectively, to be attached to the inventive construction.
Figure 2B:
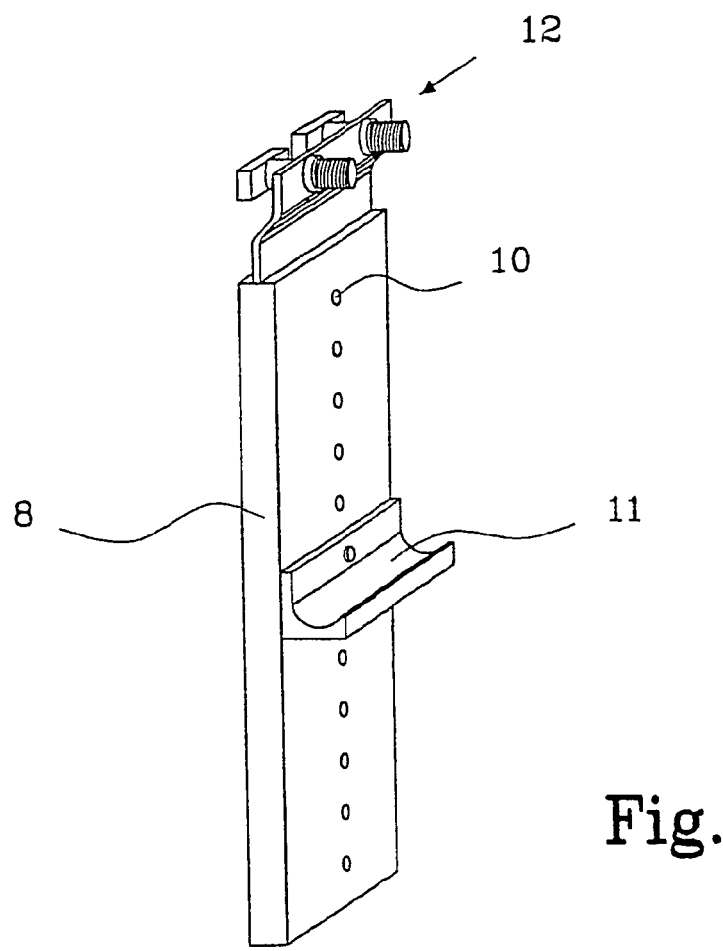

FIGS. 2a and 2b show another advantage obtained when using the inventive pit edge construction according to the present invention. Since this construction provides more space in the pit 1, there is easily room for placing holding rails in the pit 1. FIGS. 2a and 2b illustrate such a holding rail 7 (FIG. 2a), and also a holder 8 (FIG. 2b) to be fastened to the holding rail 7. As shown in FIG. 2a, the holding rail 7 is an ordinary beam, preferably including holes 9 for enabling a simple mounting of the holding rail 7 in the pit 1. In FIG. 2a, the profile of the holding rail 7 is shown to be horseshoe-shaped. The profile of the holding rail 7 could of course be any other known profile, to which one or more holders 8 can be attached, for example an essentially L-shaped or U-shaped profile.

FIG. 2b shows an example of a holder 8 that can be used. The holder 8 could for example be a plate, made of metal or some other suitable material, including holes 10 for attachment of one or more pipe supports 11, and possibly other fastening means (not shown). The holder 8 preferably includes several holes 10 for enabling attachment of the pipe supports 11 at a desired location. The holder 8 also includes some attachment means 12, for enabling a simple mounting to the holding rail 7. The attachment means 12 should also be easily adjustable in relation to the holding rail 7, that is, the holder 8 should be easy to move along the holding rail 7. The attachment means 12 shown in FIG. 2b comprises one such attachment, easy to move. The attachment means 12 shown in FIG. 2b comprises a bolt head having an elongated shape. It is designed so that it may be inserted into the holding rail 7. To secure the holder 8 to the holding rail 7 the bolt head is turned approximately 45 degrees and a nut is thereafter fastened to the threads of the bolt head. Thereby the holder 8 may be moved easily, as the holding rail 7 acts as a guidance means. The user may thus simply pull the holder 8 along the holding rail 7, and in a convenient manner position it at a desired location. The holder 8 may further be locked at a certain position along the holding rail 7, if desired.

In an alternative embodiment the holding rails 7 are fastened directly onto the pit wall 3. This alternative, however, involves the drilling of mounting holes in the pit wall 3, thus giving a somewhat more labour-intensive fastening procedure, than the alternative described above, where the holding rails 7 are easily fastened to the profile 2 comprising drilled holes.

The milk lines of an automatic milking system must have a certain slope in order to allow the milk to flow properly. The prior art method to accomplish the desired slope is to fasten the milk lines to holders attached to the pit wall, the holders being spaced apart with predetermined distances. This is a laborious procedure, where the assembly worker has to know the exact distances between the milking parlours, and thereby where to fasten the holders. This is thereby a static solution, with no means to easily change the positions of the holders. If the holders need to be moved, for example if the slope of milk lines has to be changed, the assembly worker simply has to drill new holes in the pit wall, and move the holders.

In accordance with the inventive construction, holding rails 7 are fastened to the profile 2. Since the overhang 5 and the reinforcement strut 6 takes much lesser space than the bulky concrete overhangs used today, and since they in addition are slanted, there is plenty of room for an installation worker, and it is thus very easy to mount the holding rails 7 to the pit wall 3.

Figure 3:
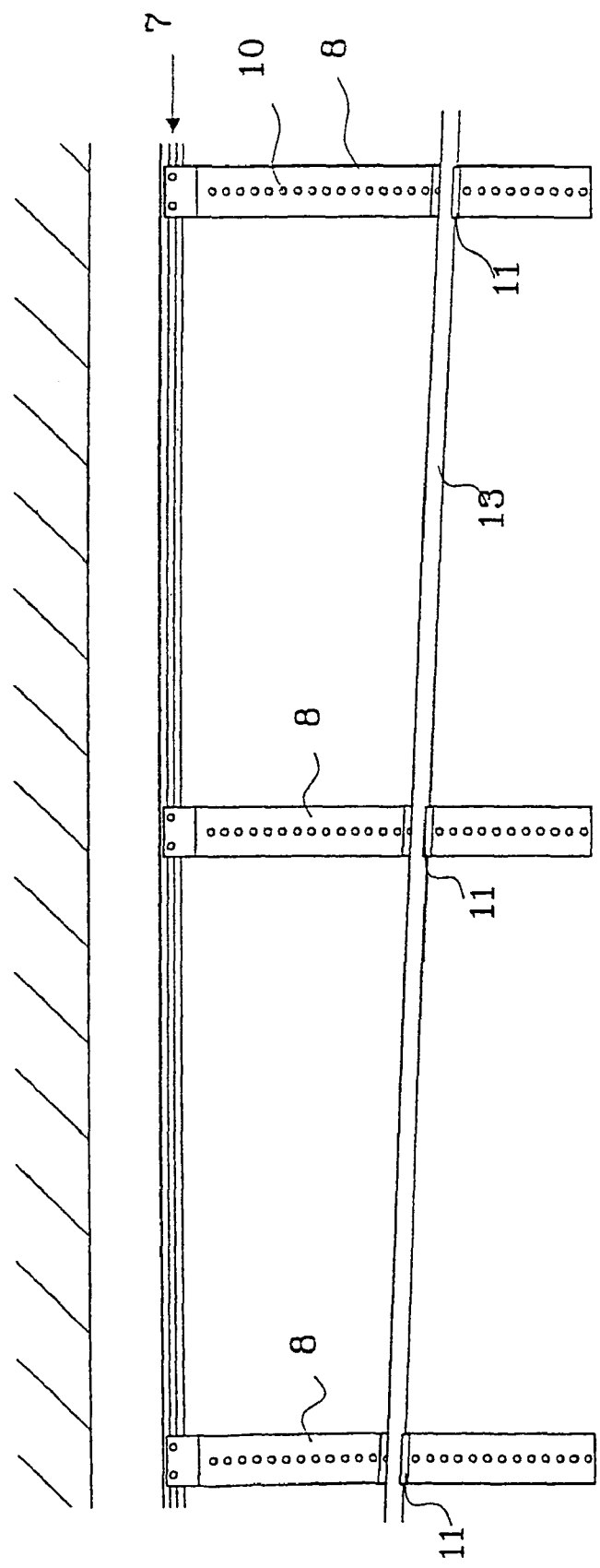
FIG. 3 illustrates how a desired slope of a milk line can be obtained by means of the invention.

The holding rails 7 thus extend longitudinally along the pit wall 3. The holders 8, described above, are fastened to these holding rails 7 at the desired locations, with suitable distances in between, and easy to move should the distance need to be adjusted. The pipe supports 11 are thereafter attached to the holders 8 at positions giving the desired slope. This is shown schematically in FIG. 3. The pipe support 11 of the first holder 8 is placed at a certain position, probably rather high, i.e. near the holding rail 7. The pipe support 11 of the second holder 8 is placed somewhat lower than the first, the third even lower and so on, thus giving the milk line 13 a certain slope. It is now easy to alter the distances, since all one has to do is to move the holder 8 and/or the pipe supports 11, and thus accomplishing another slope. There is no need to perform the cumbersome labour of drilling new holes for attaching the milk line holders, as in the prior art solution described above.

Furthermore, other equipment needed, for example a milk meter of the like, can also easily be moved to a desired location. If the milk meter is attached to a holder 8, adjustably fastened to the holding rail 7, the user may easily move it along the holding rail 7.

Irrespective of whether the holding rails 7 are fastened directly to the concrete wall 3 or by means of the profile 2 described above, it is advantageous to fasten them horizontally, that is, with a 0° inclination. The holders 8 and the supports 11 may then easily be pre-manufactured with pre-set settings, at least approximately, knowing the desired slopes, and distances between the milking parlours. Thereby troublesome work in the pit 1 is avoided; all one possibly has to do, is to adjust the distances between the holders 8 and/or supports 11 somewhat in order to get the desired slopes of, for example, milk lines 13.

The invention claimed is:

1. A construction for an overhang in a pit of a milking parlour comprising:
   a profile fastened to an edge of the pit of the milking parlour and running horizontally along the edge of the pit milking parlour;
   a metal overhang attached to said profile, wherein said overhang is adapted to have cows standing thereon;
   at least one anchor, by which the profile is anchored into a wall of the pit of the milking parlour;
   a reinforcement strut attached to said profile in order to support said metal overhang, and
   at least one holding rail attached to said reinforcement strut,
   wherein the at least one holding rail fastens one or more holding members thereon, and enables adjustable fastening of milking related equipment in the pit.

2. The construction as claimed in claim 1, wherein said profile and said metal overhang are pre-assembled, enabling a simple mounting in the pit.

3. The construction as claimed in claim 1, wherein the reinforcement strut is pre-assembled together with said profile and said metal overhang, enabling a simple mounting in the pit.

4. The construction as claimed in claim 1, wherein the metal overhang and the reinforcement strut are bent at a certain distance, giving a slanted outer part of the metal overhang.

5. The construction as claimed in claim 1, wherein the outer end of the metal overhang is wadded in order to provide a comfortable leaning portion to a person working in the pit.

6. The construction as claimed in claim 1, wherein said profile is an ⌈-shaped profile, an I-shaped profile or an U-shaped profile.

7. The construction as claimed in claim 1, further comprising:
   one or more holders adjustably fastened to the at least one holding rail.

8. The construction as claimed in claim 7, wherein one or more pipe supports are adjustably fastened to said one or more holders.

9. The construction as claimed in claim 8, wherein said one or more pipe supports are adjusted in relation to said one or more holders in a vertical direction, and thereby provide a desired slope for milk lines attached to the one or more pipe supports.

10. The construction as claimed in claim 1, wherein each of the at least one holding rail extends in a substantially horizontal plane in the pit.

11. The construction as claimed in claim 7, wherein said one or more holders are pre-set, enabling a simple mounting in the pit.

12. The construction as claimed in claim 8, wherein said one or more pipe supports are pre-set, enabling a simple mounting in the pit.

* * * * *